(12) United States Patent
Robert Safavi et al.

(10) Patent No.: US 9,647,814 B2
(45) Date of Patent: May 9, 2017

(54) METHOD FOR TRANSMISSION OF CONTROL CHANNEL SIGNALS

(71) Applicant: Huawei Technologies Co., Ltd., Shenzhen, Guangdong (CN)

(72) Inventors: Anahid Robert Safavi, Kista (SE); Branislav Popovic, Kista (SE); Fredrik Berggren, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 118 days.

(21) Appl. No.: 14/538,448

(22) Filed: Nov. 11, 2014

(65) Prior Publication Data

US 2015/0063286 A1 Mar. 5, 2015

Related U.S. Application Data

(63) Continuation of application No. PCT/EP2012/058805, filed on May 11, 2012.

(51) Int. Cl.
*H04L 5/00* (2006.01)
(52) U.S. Cl.
CPC .......... *H04L 5/0051* (2013.01); *H04L 5/0053* (2013.01)
(58) Field of Classification Search
CPC .................. H04L 5/0051; H04L 5/0053
See application file for complete search history.

(56) References Cited

U.S. PATENT DOCUMENTS

| 2012/0315859 A1* | 12/2012 | Lee | H04J 11/005 455/67.13 |
| 2013/0114522 A1* | 5/2013 | Frenne | H04L 5/0094 370/329 |
| 2014/0286297 A1 | 9/2014 | Zhao et al. | |

FOREIGN PATENT DOCUMENTS

| CN | 102186251 A | 9/2011 |
| CN | 102395206 A | 3/2012 |
| WO | WO 2011105726 A2 | 9/2011 |

OTHER PUBLICATIONS

Dahlman et al., "4G LTE/LTE-Advanced for Mobile Broadband," pp. 1-431, Academic Press, Oxford, UK (2011).
(Continued)

*Primary Examiner* — Chandrahas Patel
(74) *Attorney, Agent, or Firm* — Leydig, Voit & Mayer, Ltd.

(57) ABSTRACT

The present invention relates to a method in a network control node for transmission of control channel signals in a wireless communication system, the wireless communication system employing scheduling of physical resource blocks (PRBs) used for each new transmission of a control channel signal, wherein each control channel signal is related to one or more control channel elements (CCEs); the method comprising the steps of: removing user specific reference signals in associated physical resource blocks (PRBs) if the associated physical resource blocks (PRBs) comprises at least one control channel signal; inserting control channel signals in the associated physical resource blocks (PRBs); and transmitting the associated physical resource blocks (PRBs). Furthermore, the invention also relates to a computer program, a computer program product, and a network control node device thereof.

20 Claims, 1 Drawing Sheet

(56) References Cited

OTHER PUBLICATIONS

"3$^{rd}$ Generation Partnership Project; Technical Specification Group Radio Access Network; Evolved Universal Terrestrial Radio Access (E-UTRA); Physical Channels and Modulation (Release 10)," 3GPP TS 36.211, V10.4.0, pp. 1-101, 3$^{rd}$ Generation Partnership Project, Valbonne, France (Dec. 2011).
"Search space design for ePDCCH," 3GPP TSG RAN WG1 Meeting #68, Dresden, Germany, R1-120048, 3$^{rd}$ Generation Partnership Project, Valbonne, France (Feb. 6-10, 2012).
"Details of multiplexing of DCI messages," 3GPP TSG RAN WG1 Meeting #68bis, Jeju, Republic of Korea, R1-121023, 3$^{rd}$ Generation Partnership Project, Valbonne, France (Mar. 26-30, 2012).
"Further Discussions on DMRS-Based E-PDCCH Transmission," 3GPP TSG RAN WG1 Meeting #68bis, Jeju, Republic of Korea, R1-121641, 3$^{rd}$ Generation Partnership Project, Valbonne, France (Mar. 26-30, 2012).
1$^{st}$ Office Action in corresponding Chinese Application No. 201280072779 (Aug. 8, 2016).

\* cited by examiner

METHOD FOR TRANSMISSION OF CONTROL CHANNEL SIGNALS

CROSS-REFERENCE TO RELATED APPLICATIONS

This application is a continuation of International Patent Application No. PCT/EP2012/058805, filed on May 11, 2012, which is hereby incorporated by reference in its entirety.

TECHNICAL FIELD

The present invention relates to a method for transmission of control channel signals in a wireless communication system. Furthermore, the invention also relates to a computer program, a computer program product, and a network control node device thereof.

BACKGROUND

The physical downlink control channel (PDCCH) is used to carry downlink control information (DCI), required for reception of physical downlink control shared channel (PDSCH), and for scheduling grants enabling transmission on physical uplink shared channel (PUSCH). The PDCCH is transmitted in control channel region occupying a few Orthogonal Frequency Division Multiplexing (OFDM) symbols ranged from 1 to 3 at the beginning of the downlink sub-frame. Remaining part of the sub-frame is called data region. The data region is used for PDSCH transmission.

In order to allow for a simple processing of control channels in the receiver and simple multiplexing at the transmitter, the mapping of PDCCHs to resource element (RE) is subject to a certain structure. The structure is based on so-called control channel elements (CCE). CCE denote a set of 36 useful resource elements. The mapping of CCEs, which are logical units, to resource elements, which are physical units, is a function of the cell-id. The number of CCEs, i.e. one, two, four or eight required for a certain PDCCH, depends on the payload size of downlink control information and the channel coding rate. The number of CCEs used for a PDCCH is also referred to as the aggregation level. In practice blind decoding of the control channel is done on search spaces considering CCE as the processing unit. More precisely, a search space is a set of candidate control channels formed by CCEs on a given aggregation level, which the terminal is supposed to attempt to blindly decode.

One specific user terminal can be addressed only if the control information is transmitted on a PDCCH in the terminal's search space. Therefore, each user terminal in the system has its own search space known as a user specific search space (UE-SS). User specific search spaces in 3GPP Rel-8 are defined without explicit signalling. Starting position of UE-specific search space is a logical entity which is derived as a function of terminal identity and the sub-frame number.

In some situations, a group of user terminals in the system are addressed. This can happen for example for paging, sending system information and RACH procedure at the beginning of communication (initial step of communication). In order to be able to address all the user terminals, a common search space (CSS) is defined in 3GPP LTE. All the user terminals search in this common search space to decode related control information. The common search space is predefined and it consists of first 16 CCEs of the search space. This means that the starting position of common search space is set to zero. The aggregation level used for common search space is limited to four or eight.

It has been widely recognized that the control channel region for LTE PDCCH might be insufficient for future development scenarios where a significant increase of the number of users is expected. In order to increase the capacity of control channels a UE-specific control channel called enhanced PDCCH (ePDCCH) is introduced. The ePDCCH is allocated in the data region, and the ePDCCH can take advantage of some features which was reserved previously for PDSCH transmission, such as frequency selective scheduling to avoid interference and usage of reference signals which up to now have been used for PDSCH transmission only.

Enhanced control channel is supposed to be scheduled in data region as PDSCH with granularity of one PRB. Scheduling denotes dynamic or semi-static allocation of PRBs by a NodeB (base station). In the case of dynamic allocation, feedback information received from a UE indicates the suitable PRBs to use for sending related control information. More precisely, the ePDCCH is sent over a selected PRB and the selected PRB can change from one subframe to other based on received feedback information from the UE. In the case of semi-static allocation, selected PRB remains the same for one or more consecutive sub-frames and is changed for example when there is a handover or a newly received allocation. This is similar to scheduling of PDSCH in the downlink.

Definition of the basic logical unit of control channel called enhanced CCE (eCCE) is still an open issue. The eCCE definition will impact on the multiplexing of eCCEs in one (or several) PRB pair(s) and search space design. However, the eCCEs will contain a number of useful resource elements as in legacy PDCCH.

Another open topic is to decide if UE-specific search space related to enhanced control channel is predefined as it is the case for PDCCH or it is signalled to the UE and is changing from one sub-frame to other. The decision concerning the starting position of UE-specific search space is also in hold. This information could be based on UE-id or signalled to the UE. Whatever decided the definition of search space as a set of candidate control channels formed by eCCEs on a given aggregation level which the terminal is supposed to attempt to blindly decode remains valid.

Common search space related to enhanced control channel (if there is any) will anyhow occupy predefined resource elements eCCEs. Those predefined resource elements might occupy non consecutive PRB pairs.

The eCCEs are mapped in to one (or several) PRB pair(s) in presence of different reference signals. In LTE system, various reference signals are used to perform measurement or demodulation. Each reference signal is associated to an antenna port (AP) in the downlink of LTE system. Reference signals are predefined sequences which are allocated in predefined resource elements on the sub-frame.

In LTE Rel-8 DL transmission, cell-specific reference signals (CRS) are defined for both measurement and demodulation. The CRSs are broadcasted and common to all the UEs in the cell, and each CRS defines one antenna port. The number of antenna ports for eNB can be configured as 1, 2 and 4. The legacy control channel (PDCCH) uses CRS for modulation and decoding of control information in the system.

In LTE Rel-10 DL transmission, the RSs for measurement and demodulation are decoupled respectively to CSI reference signals (CSI-RS) and demodulation reference signals (DMRS). The CSI-RS which is used for measurement is UE-specific. Compared to the CRSs in LTE Rel-8, the CSI-RS has lower density in the frequency and time domain. The DMRS is used for PDSCH demodulation, which is also UE-specific. DMRS positions in sub-frames are always occupying the same positions. For some cases there are 12 resource elements used for DMRSs and for some case there are 24 resource elements are used. DMRS is used for modulation and decoding of newly designed ePDCCH.

The exact number of resource elements used for CSI-RS depends on the number of used antenna ports, sub-frame index and the number of used configurations. In a resource block pair there are up to 40 possible positions for CSI-RS as it is shown in FIG. 1. Generally a subset of those resource elements are used for desired UE.

For example, in the case of two antenna ports for a specific UE, CSI-RS resource elements of this UE occupy two consecutive reference symbols in a PRB pair separated by orthogonal cover code (OCC). This corresponds to one single configuration. Non-zero transmission power over these resource elements is assumed which enable the desired UE to perform its own measurement. A specific UE is also informed about CSI-RS configurations of other UEs. Zero-transmission power over resource elements allocated to other UEs is assumed. The combination of this information enables the desired UE to extract from the received signal, symbols containing its own data without ambiguity.

Signalling of CSI-RS is performed via higher layer signalling over PDSCH, being in that way dependent to PDCCH control channel One PDCCH (or ePDCCH) carries one DCI (Downlink Control Information) message. There are different formats of DCI in the system. In initial communication stage related to control channel a UE should detect related DCI format in the common search space successfully. Once the DCI format is successfully detected the UE can decode its PDSCH as resource allocation and MCS modulation related to PDSCH are included in DCI message. PDSCH is then used to convey higher layer signalling information to the UE. It means that no higher layer signalling is available prior to the correct detection of control channel.

Furthermore, new carrier type is defined as a carrier that is not backwards compatible to previous releases, comprising one or several characteristics of:
  Not supporting transmission of the CRS;
  Not supporting the use of CRS for demodulation;
  Not supporting transmission of at least one of PDCCH, PCFICH, PHICH or PBCH;
  Only supporting DM-RS based PDSCH demodulation;
  Not supporting transmission of at least one of the PSS and the SSS; and
  Supporting PDSCH being mapped from the first OFDM symbol in the subframe.

As opposed to CRSs and DMRSs, whose resource elements are predefined and thus have known positions within each PRB pair, the CSI-RSs have UE-specific time-frequency positions. Moreover, according to LTE Rel-10 each UE is informed about both its own CSI-RS and the CSI-RS configurations of other UEs active in the same sub-frame in order to be able to correctly extract its own data from the PDSCH. Signalling of CSI-RS is performed using a bitmap via higher layer signalling over PDSCH being in that way dependent on the PDCCH. As the ePDCCH is also a downlink control channel, it is natural to expect that it can be used also to support higher-layer signalling of CSI-RS bitmap independent of PDCCH (legacy control channel).

At the initial stage related to control channel communication, the UE monitors only the ePDCCH common search space to get information about DCI format if there is no PDCCH available. At this stage there is no any information about CSI-RS bitmap available as ePDCCH has not been decoded yet. Without CSI-RS bit map information the UE can't decode ePDCCH correctly if there is CSI-RS located in the common search space. This is a chicken and egg problem. Therefore, even if the ePDCCH is available in the system, if the eCCEs are mapped to ePDCCH by rate matching the signalling of the CSI-RS bitmap to the UE still has to be supported by the PDCCH at the initial communication.

Another problem with rate matching around CSI-RS (i.e. mapping control channel around CSI-RS) is that for some configurations overhead of reference signals becomes considerable. This problem is valid for both UE-specific search space and common search space.

One proposal could be that the eCCE is rate matched with respect to DMRS (i.e. mapped around DMRS) but punctured by CSI-RS. The UE does not know the position of CSI-RS, so it performs the ePDCCH demodulation as if there is no CSI-RS in the ePDCCH PRB pairs (although the CSI-RS is actually completely transmitted). The transmitter adjusts the ePDCCH code rate (i.e. the aggregation level) to compensate the ePDCCH demodulation errors. The problem with this solution is that if CSI-RS overhead is considerable then coding rate is considerably reduced leading to a high overhead and un-efficient usage of ePDCCH resources which can lead to blocking of some UEs.

Hence one problem to solve is how to transmit ePDCCH with minimum overhead and independent of higher layer signalling. Two different approaches for mapping eCCEs into a PRB pair have been discussed in prior art.

The first approach, called rate matching consists of mapping eCCEs around current reference signals including CRS, DMRS and CSI-RS. In this approach the number of eCCEs in a RB pair is variable and depends on the reference signal overhead.

In the second approach, called eCCE puncturing the maximum number of eCCEs mapped in a PRB pair is fixed, and when there is a collision between reference signals and an eCCE, the eCCE is punctured and is not transmitted. In this latter approach it is assumed that eCCE puncturing is happening only when there is a collision with CRS and CSI-RS reference signals. More precisely, eCCEs are rate matched around DMRS reference signals. In order to keep the detection performance of eCCE acceptable, it is proposed to use higher aggregation levels. More precisely, in the second approach it is assumed that each eCCE or building structure has 36 resource elements and one, two four eCCEs could be aggregated into one PRB pair creating aggregation level of one, two or four. In this approach eCCE is rate matched with respect to DMRS but punctured by CSI-RS, CRS and legacy control channel. If this approach is used then ePDCCH transmission efficiency and performance might be highly affected. For example, if we consider the case where all CSI-RS resource elements are used in a PRB pair, the number of ePDCCH resource elements that are not punctured for aggregation level of one is 23 resource elements out of 36 resource elements. With such a high number of errors one might not be able to use aggregation level of one at all. This number is about 40 resource elements out of total 72, for aggregation level of two if we assume that link adaptation is used to enable the usage of aggregation level of two instead of one. It is even not sure that aggregation level of two could perform better with such a high error.

Consequently, low aggregation levels are not transmitted at all. Using high aggregation levels instead of low aggregation levels is not efficient to allocate ePDCCH resources in different PRBs. Another drawback is that, even for high aggregation levels as receiver will attempt to blindly decode transmitted CSI-RS and CRS, there is a high probability of false detection which might deteriorate the overall performance of ePDCCH compared to PDCCH.

According to both prior art approaches described above CSI-RS reference signal transmission are maintained.

Another prior art consists of 3GPP specifications, where collision of CSI-RS for some of transport channels is considered. It is assumed that CSI-RS are not transmitted at all and are punctured in sub-frames containing paging message and sub-frames when transmission of CSI-RS would collide with transmission of synchronization signal and PBCH.

SUMMARY

An object of the present invention is to provide a solution which mitigates or solves the drawbacks and problems of prior art solutions.

According to a first aspect of the invention, the above mentioned objects are achieved by a method in a network control node for transmission of control channel signals in a wireless communication system, said wireless communication system employing scheduling of physical resource blocks (PRBs) used for each new transmission of a control channel signal, wherein each control channel signal is related to one or more control channel elements (CCEs); said method comprising the steps of:
  removing user specific reference signals in associated physical resource blocks (PRBs) if said associated physical resource blocks (PRBs) comprises at least one control channel signal;
  inserting control channel signals in said associated physical resource blocks (PRBs); and
  transmitting said associated physical resource blocks (PRBs);
  wherein said user specific reference signals are channel state indication reference signals (CSI-RS).

Embodiments of the method above are defined in the appended dependent claims. Further, the invention also relates to a computer program and a computer program product corresponding to the different methods according to the invention.

According to a second aspect the above mentioned objects are achieved by a network control node device arranged for transmission of control channel signals in a wireless communication system, said wireless communication system employing scheduling of physical resource blocks (PRBs) used for each new transmission of a control channel signal, wherein each control channel signal is related to one or more control channel elements (CCEs); said network control node device further being arranged to:
  remove user specific reference signals in associated physical resource blocks (PRBs) if said associated physical resource blocks (PRBs) comprises at least one control channel signal;
  insert control channel signals in said associated physical resource blocks (PRBs); and
  transmit said associated physical resource blocks (PRBs);
  wherein said user specific reference signals are channel state indication reference signals (CSI-RS).

One advantage of the solution according to the present invention is that decoding of enhanced control channel signals (ePDCCH) in associated common search space is possible without additional higher layer signalling.

Another advantage is that link adaptation is easy to implement as the number of resource elements in one control channel element (eCCE) can be held fixed.

Yet another advantage is that there are more resource elements available for enhanced control channel signals (ePDCCH) transmission and overhead related to reference signals in the enhanced control channel signals (ePDCCH) region is therefore minimized.

Further applications and advantages of the invention will be apparent from the following detailed description.

BRIEF DESCRIPTION OF DRAWINGS

The appended drawings are intended to clarify and explain different embodiments of the present invention in which.

DESCRIPTION OF EMBODIMENTS

Figure 1:
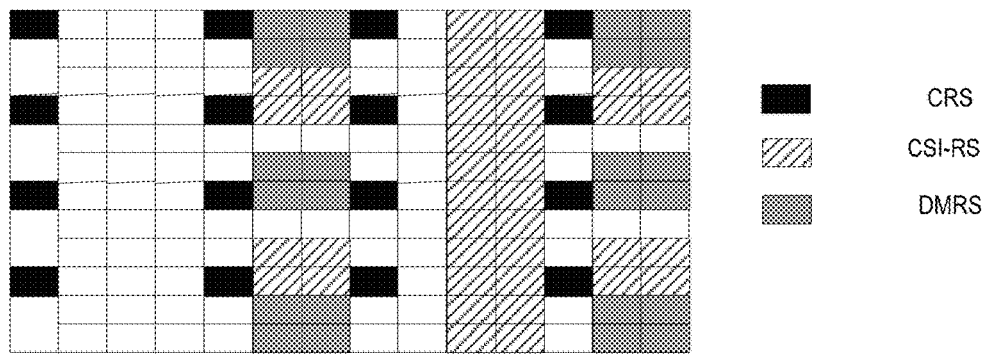
FIG. 1 illustrates all possible CSI-RS positions taking into account different subframes and different antenna port configuration.

To achieve the aforementioned and further objects, the present invention relates to a method a network control node for transmission of control channel signals in a wireless communication system. The mentioned system is arranged to employ scheduling of PRBs used for each new transmission of a control channel signal. Each control channel signal is related to one or more CCEs. The present method comprises the steps of: removing user specific reference signals in associated PRBs if the associated PRBs comprise at least one control channel signal; inserting control channel signals in the associated PRBs; and transmitting the associated PRBs. An associated PRB contains different type of reference signals including cell-specific and user-specific reference signal used to perform decoding of information or performing measurements in the downlink of the system.

If rate matching around CSI-RS is used to map eCCEs in the transmitter, the signalling of CSI-RS bitmap to the UE still has to be supported by legacy control channel PDCCH or even ePDDCH. However, if there is no PDCCH available in the system then rate matching cannot work at initial control channel communication and when UE monitors only the ePDCCH common search space a UE will not get any information on CSI-RS positions to be able to blind decode ePDCCH. For example, for a new carrier type there is no PDCCH available in the system. Another example is the case where the common search space is located in the PDSCH region. In this case, at the beginning of communication when RACH and system information are transmitted there is no PDCCH available. For CoMP scenario 4, it can be assumed that a macro cell would transmit PDCCH and that a pico cell would transmit ePDCCH only.

Therefore, the solution according to the invention is not to use CSI-RS bitmap for ePDCCH demodulation by puncturing (removing), at the transmitter, the CSI-RSs in the PRB pairs carrying ePDCCHs. In that case each UE can perform correct demodulation of ePDCCH without knowing CSI-RS bitmap. Puncturing CSI-RS in resource elements associated with transmission of ePDCCH means that CSI-RS or user specific reference signals are removed from the PRB pairs which are used to transmit enhanced control channel. When CSI-RS reference signals are removed from the PRB pair control channel can be mapped to those resource elements which were used for transmission of CSI-RS. Finally, the (enhanced) control channel signal can be transmitted after mapping, without CSI-RS using the maximum available resources. It is therefore noted that in the present solution, CSI-RS is removed only in PRB pairs scheduled for transmission of control channel contrary to the case of PBCH or synchronization signal where CSI-RS are removed over the whole downlink bandwidth.

Preferably, the user specific reference signals are CSI-RS and the wireless communication system is a 3GPP cellular system. Furthermore, the control channel signals according to the method correspond to ePDCCHs according to an embodiment of the invention. Regarding the network control node it is a communication device having the suitable functions and capabilities for executing the above steps. Suitable device are e.g. base station nodes, relay nodes, or remote radio heads (RRHs).

It should also be realised that the positions for the user specific reference signals do not have to be signalled to the user according to another embodiment of the invention. For distributed ePDCCH transmission it is assumed that one ePDCCH is transmitted over several non consecutive PRB pairs to achieve frequency diversity. For this approach the impact on legacy UE is expected to be small or marginal based on these results, since it has been shown in simulation results that if one PRB is impacted, the corresponding error on downlink channel estimator and final throughput can be neglected.

Moreover, the associated PRBs for one user are consecutive or non-consecutive PRBs. The fact that one or more PRBs are used in the system depends on the number of UEs which are sending control channel information considering that each UE occupy one or more than one PRB pair in the case of enhanced control channel depending on the used aggregation level. Associated PRBs could be consecutive or non-consecutive. The fact that PRBs are consecutive or not can depend on the feedback information received from a UE to schedule enhanced control channel Enhanced control channel is supposed to be scheduled over the PRB pair(s) that guarantees the best throughput to achieve so called scheduling gain. When feedback is available, selected PRB(s) could be consecutive or not. For the case when the feedback is not available, or at the initial stage of control channel communication, scheduling gain cannot be achieved. In this case, related PRB pairs of desired UE are selected in a non-consecutive manner to achieve frequency diversity.

According to two different embodiments of the invention the step of removing the user specific reference signals involves:
  removing only a part of the user specific reference signals in the associated PRBs, wherein the part of the user specific reference signals are related to one user only of the system. In some cases it can happen that the a user has only information of its own user specific reference signal (i.e. a UE receives only its own CSI-RS bitmap) and does not have information of user specific reference signals related to other users of the system (i.e. the UE does not receive CSI-RS bitmap of other UEs); or
  removing all of the user specific reference signals in the associated PRBs, wherein the all user specific reference signals are related to at least two users of the system. In this case, it can happen that the desired user has knowledge of its own user specific reference signals and also user specific reference signals related to other users (i.e. a UE receives CSI-RS bitmap related to its own user specific reference signals and CSI-RS bitmap related to user specific reference signals of other UEs).

According to an embodiment of the invention puncturing parts of total CSI-RS pattern is considered. For example, it is possible to puncture only CSI-RS of the desired UE if for some reasons CSI-RS of other UEs are not available.

Regarding the step of inserting control channel signals in the associated PRBs it is preferable if the inserting step involves:
  inserting the control channel signals by using pairs of resource elements in the associated PRBs used for transmission of the control channel signals.

When reliable feedback is not available, eCCEs are transmitted over several PRBs in order to achieve frequency diversity. The frequency diversity scheme which is present for legacy control channel is SFBC which might be reused for ePDCCH as well. SFBC is implemented by pairing resource elements in a PRB pair. If CSI-RS are present in the system, pairing resource elements then becomes complicated. Puncturing CSI-RS in this case will guarantee a simple implementation for SFBC independent of the position of user-specific reference signals.

According to another embodiment of the invention, detection of control channel signals in the wireless communication system is performed in search spaces containing a set of CCEs, and the search spaces are either user specific search space or a common search space common to two or more user terminals in the system. With this in mind there are three main approaches of removing the user specific reference signals, namely:
  The user specific reference signals are removed in user specific search space only. More resource elements are available in ePDCCH and overhead related to reference signal is reduced;
  The user specific reference signals are removed in common search space only. Decoding of ePDCCH in common search space is possible without additional higher layer signalling, more resource elements are available in ePDCCH and overhead related to reference signal is reduced; or
  The user specific reference signals are removed in user specific search space and in common search space. In this case, decoding of ePDCCH in common search space is possible without additional higher layer signalling and link adaptation is easy to implement as the number of resource elements in one eCCE is fixed and more resource elements are available for ePDCCH and overhead related to reference signal in ePDCCH region is minimized.

Hence, puncturing/removing CSI-RS can be performed over only common search space and CSI-RS transmission can be maintained over UE specific search space. In this case at the beginning of communication, the UE will decode common search space successfully as there is no CSI-RS bitmap. Once ePDCCH is decoded successfully the UE can thereafter decode its PDSCH. PDSCH can be used to send higher layer signalling information to the UE and the communication can start without problem.

Another alternative is to remove CSI-RS in both common search space and UE specific search space. In this case an efficient allocation of resources is performed as from one sub-frame to other there is the same number of available resources for ePDCCH transmission. Moreover, overhead of reference signals is kept to the minimum value. Same number of available resources for different sub-frames can guarantee the fixed size of eCCE per sub-frame if CSI-RS is dropped. Fixed size of eCCE can ease link adaptation.

Moreover, in this case at the beginning of communication, the UE will decode common search space successfully as there is no CSI-RS bitmap. Once ePDCCH is decoded successfully the UE can thereafter decode its PDSCH. PDSCH can be used to send higher layer signalling information to the UE and the communication can start without problem.

Yet another alternative is to remove user specific reference signals on user specific search space and maintain transmission of user-specific reference signals on the common search space. With this approach overhead related to transmission of reference signals is reduced.

Minimum overhead related to reference signals guarantee the fact that more control channel elements eCCEs can be multiplexed in one PRB pair.

A slight drawback of the present solution is a possible deterioration of CQI quality for legacy UEs (Rel-10), as the channel in some portion of subbands will not be available for the estimation. From the same reason some subband PMIs might be missing for legacy UEs, what might lead to less accurate precoding of ePDCCHs. The degree of CQI and PMI deterioration depends on the amount of CSI-RS resources that are punctured at the transmitter, and is to some extent mitigated by the wideband nature of CSI-RS signals, by relatively small expected number of ePDCCH PRB pairs, by the variation of ePDCCH frequency position from one sub-frame to another, and by increasing the time periodicity.

Figure 2:
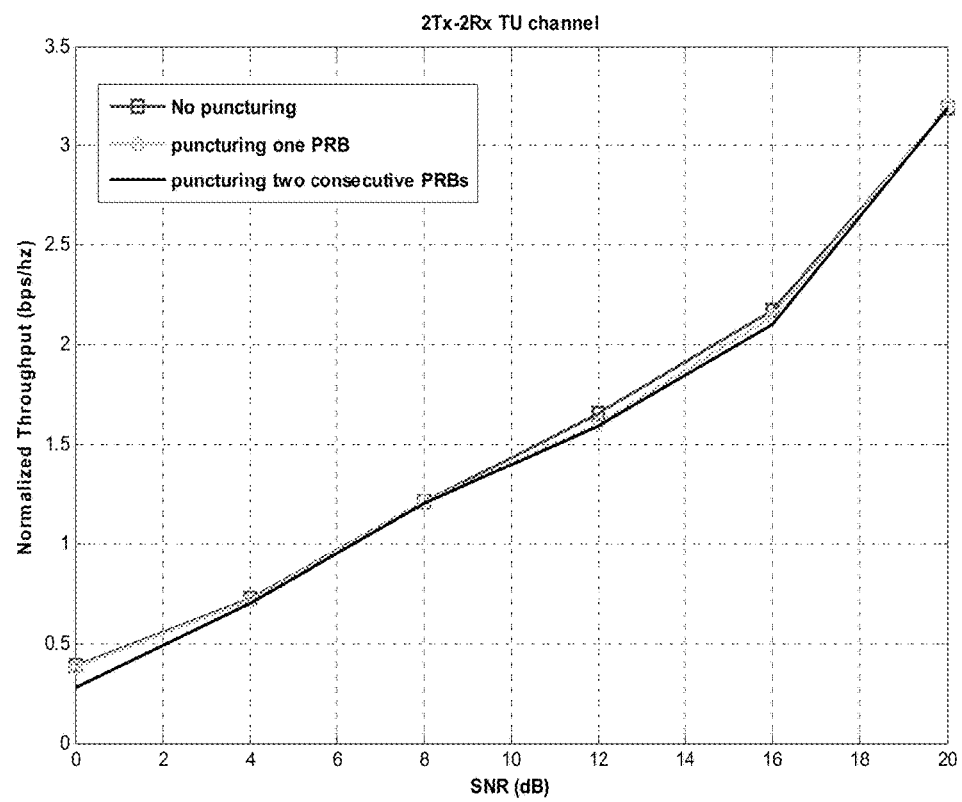
FIG. 2 shows the impact of CSI-puncturing on the normalized throughput.

Link level simulations have been performed to evaluate the amount of throughput loss expected for the legacy UEs. Simulation assumptions are mentioned in the Appendix below. For this link level simulation aperiodic CSI feed back with CQI delay of 4 msec was considered Channel estimation error for CSI-RS was modelled by adding a noise variance of 1 dB over ideal channel. In order to model the punctured/removed PRB(s) corresponding to the transmitted ePDCCH, one or two consecutive PRBs on estimated channel was corrupted by using a normalized Gaussian noise. In practice, this represents one or two ePDCCH transmission related to one or two different users considering that each ePDCCH occupy one PRB pair. In order to get the worst case, it was assumed that one or two PRBs over all sub-band CSI feedback were corrupted. Related results are shown in FIG. 2. From FIG. 2 the corresponding throughput loss for the case of puncturing only one PRB is marginal as the granularity of full feedback is 4 PRB and the corresponding ePDCCH bandwidth is only one PRB which is 25% of the total feedback bandwidth. The worst throughput loss corresponds to the case where several consecutive PRBs are used for ePDCCH transmission. For example, the case of two corrupted consecutive PRBs and related loss is also shown in FIG. 2. In this case throughput loss is about 18% for low SNR values while for high SNR values this loss is smaller, i.e. 1%. In practice the throughput loss is smaller as all the sub-bands are not corrupted with ePDCCH. Moreover eNodeB can override the reported PMI, CQI and rank.

As a further embodiment of the invention, it is realized that puncturing/removing of the CSI-RS may be beneficial for handling collisions of the CSI-RS with other signals than the downlink control channels. For example, this may include collisions between the CSI-RS and the DMRS. Such situations may occur when new DM-RS patterns are introduced in the system, e.g., for new carrier types that are not backwards compatible to carriers of earlier releases of the system. The puncturing of the CSI-RS may include puncturing of resource elements wherein the CSI-RS and DM-RS collide, or puncturing the CSI-RS in the resource blocks wherein the CSI-RS and DM-RS collide.

Furthermore, as understood by the person skilled in the art, any method according to the present invention may also be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, the invention also relates to a network control node device corresponding to the above mentioned methods. Hence a suitable device arranged for transmission of control channel signals in a wireless communication system may be modified, mutatis mutandis, according to all different embodiments described in this disclosure.

Finally, it should be understood that the present invention is not limited to the embodiments described above, but also relates to and incorporates all embodiments within the scope of the appended independent claims.

| Simulation assumptions | |
| --- | --- |
| Number Tx Antennas | 2 |
| Number Rx Antennas | 2 |
| CQI Channel Estimation | Error variance of 1 dB modelled for all SNRs |
| Channel Model | TU |
| CQI delay | 4 msec |
| UE speed | 3 km/hr |
| Simulated rank | Rank adaptation used |
| Number of scheduled RBs | 4 |
| Target HARQ termination | 10% BLER after first transmission |
| HARQ process | IR |
| Feedback type | 3-1 |
| Model for puncturing CSI-RS | 1 or 2 PRB pair(s) on estimated channel is corrupted and replaced by Gaussian white noise |
| System bandwidth | 24 RB |
| Feedback granularity | 4 RB |

What is claimed is:

1. A method in a network control node for transmission of control channel signals in a wireless communication system, said wireless communication system employing scheduling of physical resource blocks used for each new transmission of a control channel signal, wherein each control channel signal is related to one or more control channel elements (CCEs); said method comprising:
   removing user specific reference signals in associated physical resource blocks if said associated physical resource blocks comprise at least one control channel signal;
   inserting the at least one control channel signal in said associated physical resource blocks; and
   transmitting said associated physical resource blocks;
   wherein said user specific reference signals are channel state indication reference signals (CSI-RS);
   wherein the removing the user specific reference signals further comprises:
   removing only a part of said user specific reference signals in said associated physical resource blocks, wherein said part of said user specific reference signals are related to one user and is known to said one user only.

2. The method according to claim 1, wherein detection of the control channel signals in said wireless communication system is performed in search spaces containing a set of candidate CCEs, said search spaces are a user specific search space or a common search space common to two or more users.

3. The method according to claim 2, wherein
said user specific reference signals are removed in user specific search space only; or
said user specific reference signals are removed in common search space only; or
said user specific reference signals are removed in user specific search space and in common search space.

4. The method according to claim 1, wherein at least one of the following situations occurs:
(a) said control channel signals correspond to an enhanced physical downlink control channels (ePDCCH); and
(b) said network control node does not support transmission of physical downlink control channels (PDCCH).

5. The method according to claim 1, wherein said user specific reference signals are transmitted on a set of sub-carriers which do not carry any physical downlink control channel signals (PDCCHs).

6. The method according to claim 1, wherein the removing the user specific reference signals further comprises:
removing said user specific reference signals in said associated physical resource blocks at an initial control channel communication stage.

7. The method according to claim 1, wherein the removing the user specific reference signals further comprises:
removing all of said user specific reference signals in said associated physical resource blocks, wherein said all user specific reference signals are related to at least two users and is known to a user.

8. The method according to claim 1, wherein positions for said user specific reference signals are not signalled to the user.

9. The method according to claim 1, wherein the inserting the at least one control channel signal comprises:
inserting said at least one control channel signals by using pairs of resource elements (REs) in said associated physical resource blocks used for transmission of said control channel signals.

10. A network control node device arranged for transmission of control channel signals in a wireless communication system, said wireless communication system employing scheduling of physical resource blocks used for each new transmission of a control channel signal, wherein each control channel signal is related to one or more control channel elements (CCEs); said network control node device further being arranged to:
remove user specific reference signals in associated physical resource blocks if said associated physical resource blocks comprise at least one control channel signal;
insert the at least one control channel signal in said associated physical resource blocks; and
transmit said associated physical resource blocks;
wherein said user specific reference signals are channel state indication reference signals (CSI-RS);
wherein the removing the user specific reference signals further comprises:
removing only a part of said user specific reference signals in said associated physical resource blocks, wherein said part of said user specific reference signals are related to one user and is known to said one user only.

11. The network control node device according to claim 10, wherein said network control node device is configured to remove all of said user specific reference signals in said associated physical resource blocks, wherein said all user specific reference signals are related to at least two users and is known to a user.

12. The network control node device according to claim 10, wherein said network control node device is configured to insert said at least one control channel signal by using pairs of resource elements (REs) in said associated physical resource blocks used for transmission of said control channel signals.

13. The network control node device according to claim 10, wherein detection of the control channel signals in said wireless communication system is performed in search spaces containing a set of candidate CCEs, said search spaces are a user specific search space or a common search space common to two or more users.

14. The network control node device according to claim 13, wherein
said user specific reference signals are removed in user specific search space only; or
said user specific reference signals are removed in common search space only; or
said user specific reference signals are removed in user specific search space and in common search space.

15. The network control node device according to claim 10, wherein at least one of the following situations occurs:
(a) said control channel signals correspond to an enhanced physical downlink control channels (ePDCCH); and
(b) said network control node does not support transmission of physical downlink control channels (PDCCH).

16. The network control node device according to claim 10, wherein said user specific reference signals are transmitted on a set of sub-carriers which do not carry any physical downlink control channel signals (PDCCHs).

17. The network control node device according to claim 10, wherein said network control node device is configured to remove said user specific reference signals in said associated physical resource blocks at an initial control channel communication stage.

18. A non-transitory computer program product, for transmission of control channel signals in a wireless communication system, said wireless communication system employing scheduling of physical resource blocks (PRBs) used for each new transmission of a control channel signal, wherein each control channel signal is related to one or more control channel elements (CCEs), said computer program product, when executed by a processor, will cause the processor to:
remove user specific reference signals in associated physical resource blocks if said associated physical resource blocks comprise at least one control channel signal;
insert the at least one control channel signal in said associated physical resource blocks; and
transmit said associated physical resource blocks;
wherein said user specific reference signals are channel state indication reference signals (CSI-RS);
wherein when removing the user specific reference signal, the processor is further caused to implement:
removing only a part of said user specific reference signals in said associated physical resource blocks, wherein said part of said user specific reference signals are related to one user and is known to said one user only.

19. The non-transitory computer program product according to claim 18, wherein when removing the user specific reference signals, the processor is further caused to implement:
- removing all of said user specific reference signals in said associated physical resource blocks, wherein said all user specific reference signals are related to at least two users and is known to a user.

20. The non-transitory computer program product according to claim 18, wherein detection of the control channel signals in said wireless communication system is performed in search spaces containing a set of candidate CCEs, said search spaces are a user specific search space or a common search space common to two or more users.

* * * * *